Dec. 5, 1961 F. J. KENT ET AL 3,011,472
ELECTROSTATIC SPRAYER
Filed Sept. 10, 1957 4 Sheets-Sheet 1
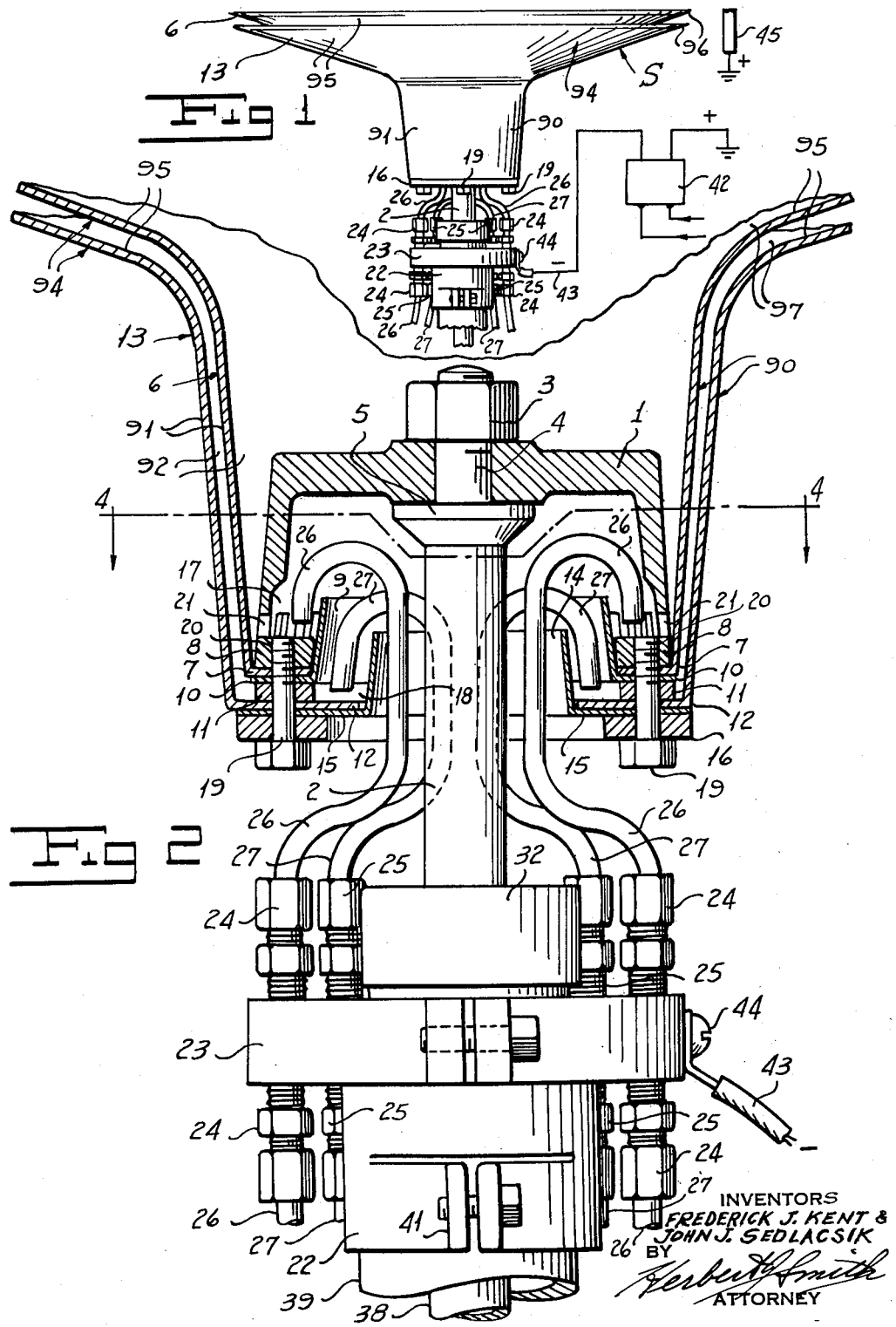
INVENTORS
FREDERICK J. KENT &
JOHN J. SEDLACSIK
BY
Herbert H. Smith
ATTORNEY Dec. 5, 1961 F. J. KENT ET AL 3,011,472
ELECTROSTATIC SPRAYER
Filed Sept. 10, 1957 4 Sheets-Sheet 2
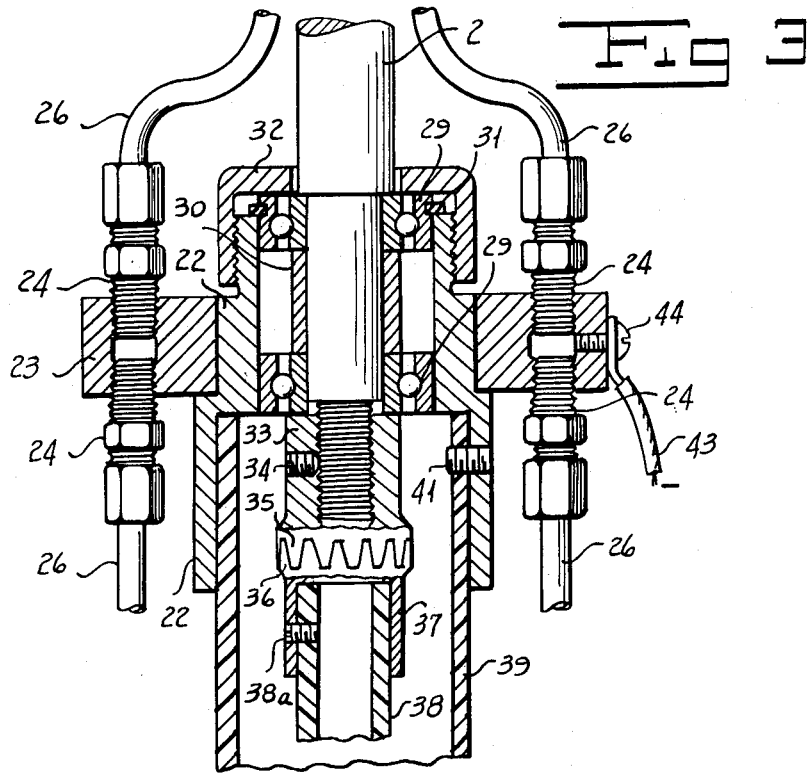
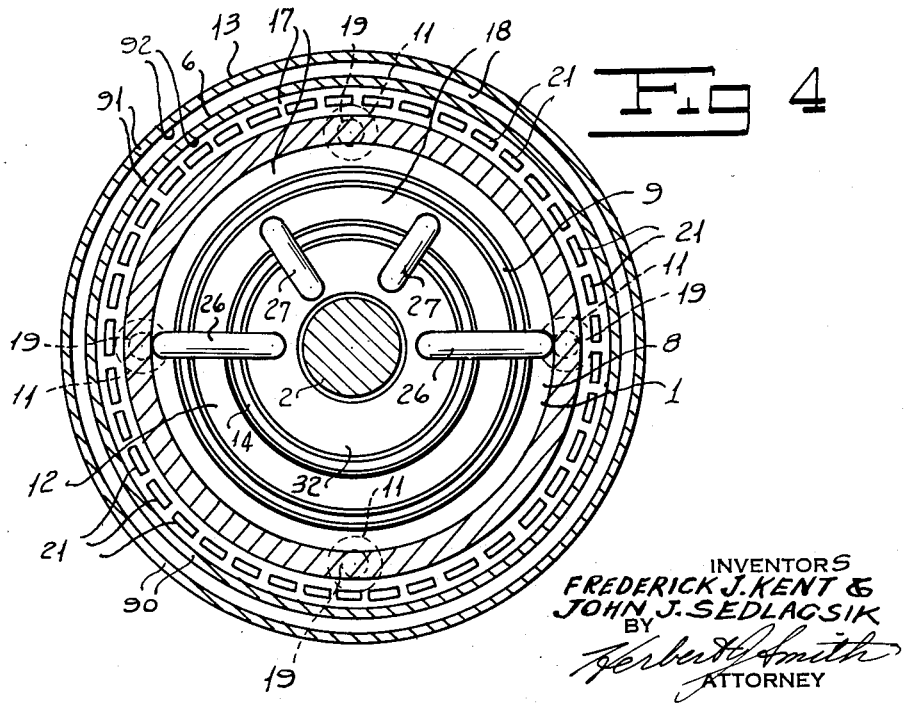
INVENTORS
FREDERICK J. KENT &
JOHN J. SEDLACSIK
BY
Herbert Smith
ATTORNEY Dec. 5, 1961 F. J. KENT ET AL 3,011,472
ELECTROSTATIC SPRAYER
Filed Sept. 10, 1957 4 Sheets-Sheet 3
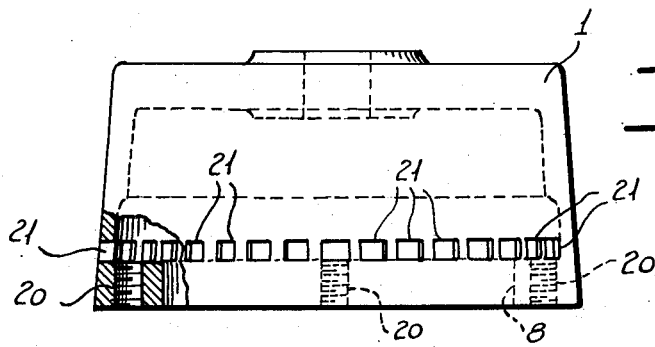
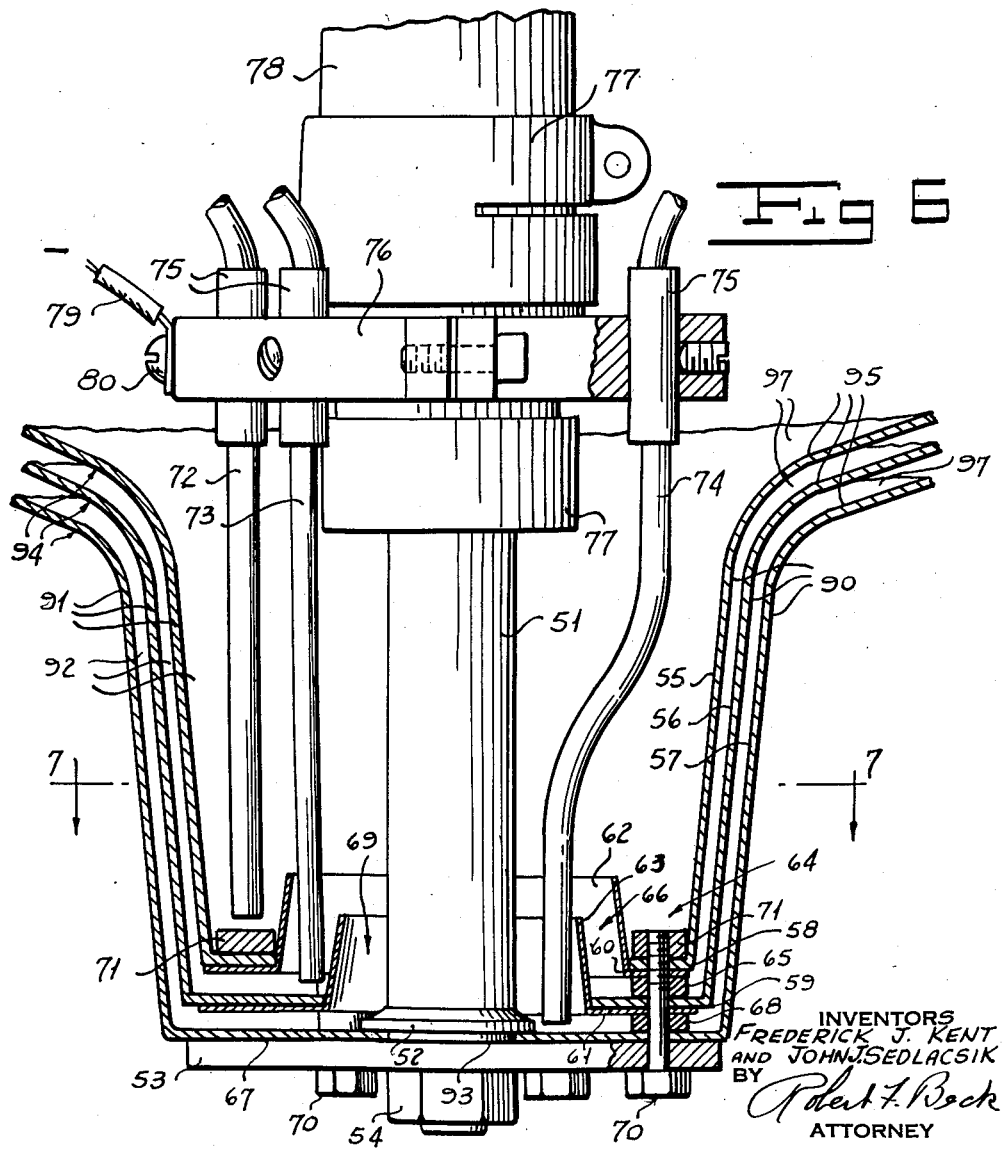
INVENTORS
FREDERICK J. KENT
AND JOHN J. SEDLACSIK
BY
Robert F. Beck
ATTORNEY

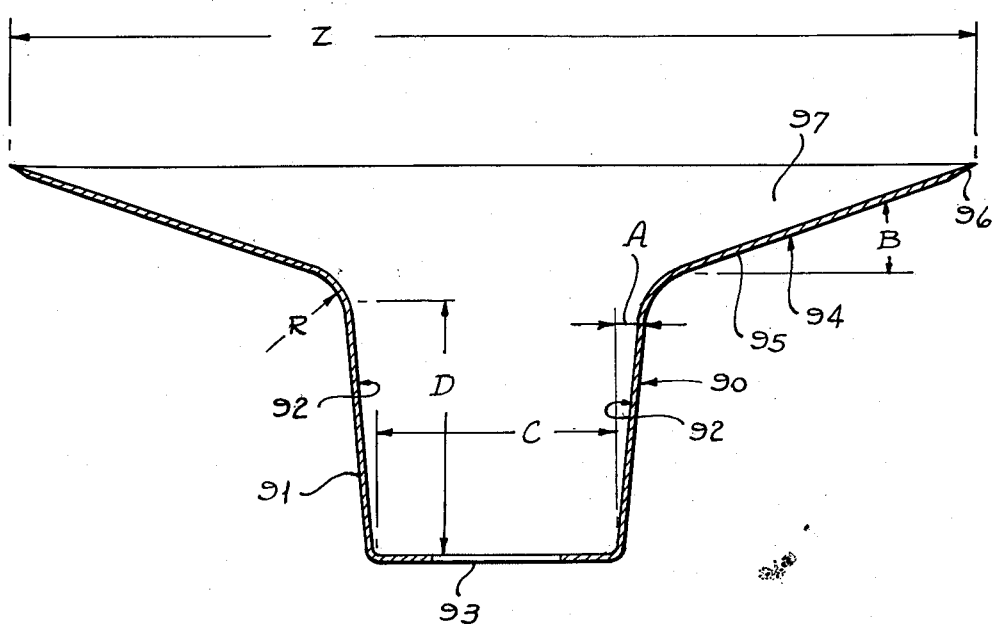
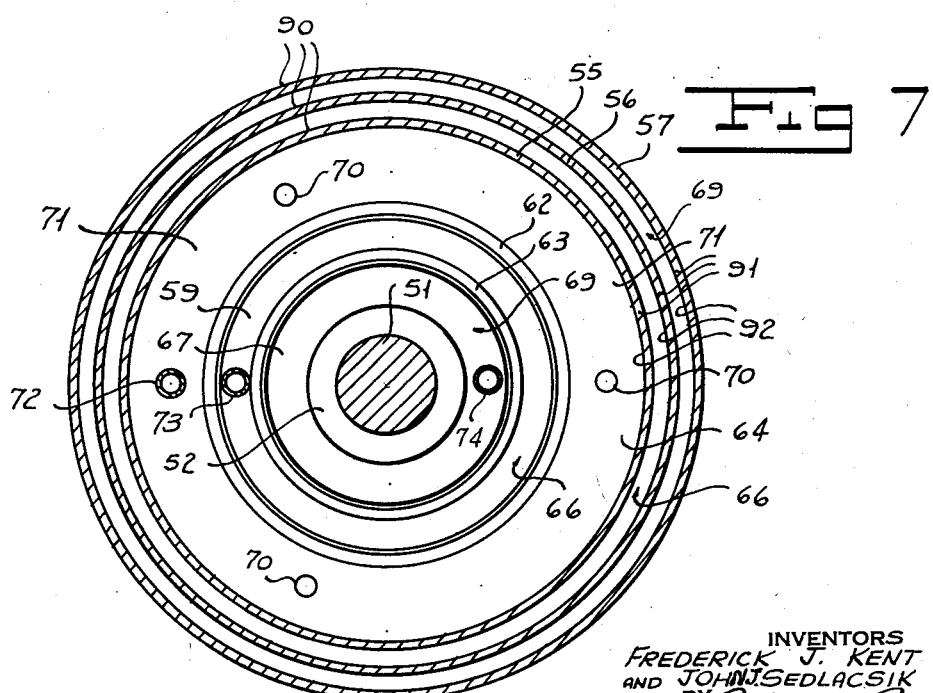

United States Patent Office 3,011,472
Patented Dec. 5, 1961

3,011,472
ELECTROSTATIC SPRAYER
Frederick J. Kent, Glen Rock, and John J. Sedlacsik, Garfield, N.J.; said Kent assignor, by direct and mesne assignments, to Interplanetary Research & Development Corp., Garfield, N.J., a corporation of New Jersey
Filed Sept. 10, 1957, Ser. No. 683,060
5 Claims. (Cl. 118—626)

This invention relates to the spraying of coating liquids, and, more particularly, to a sprayer in which the liquid is dispersed by rotating atomizing means and then transmitted to the object to be coated by an electrostatic field between the sprayer and the object.

Whether electrostatic force is used or not, it is essential, in centrifugal spraying, that the coating liquid reach the discharge edge of the atomizing means of rotor in a thin film. If the liquid film is too thick, the fluid will be expelled from the rotor at a tangent in large droplets, which is unsatisfactory because, to obtain a smooth surface coating, the liquid must be dispersed in a fine aerosol spray.

One method of spraying a large volume of liquid at a reasonable production rate, is to employ an oversize rotor having a large diameter. The disadvantage of a large or oversize rotor in electrostatic spraying is that the conveyor used in conjunction with the sprayer is spaced a fixed distance from the rotor, that distance being the most efficient one for the majority of objects being sprayed while traveling on the conveyor. When a large bulky object is placed on the conveyor, and a large or oversize rotor is used to supply sufficient coating liquid, the clearance may be less than the minimum allowable and arcing may occur. The present invention overcomes the foregoing described difficulties and tends to preclude the danger of arcing by employing, in lieu of an impractical oversize or large rotor, two or more rotors of a reduced practical size and which are disposed in stacked or nested relation and operated in such a manner that each rotor will deliver its quota of coating liquid, thereby multiplying the volume of coating liquid without an increase in the size of the sprayer of the rotors thereof.

Superior commercially available coating compounds, having desirable characteristics, such as quick hardening and good covering ability, scratch resistance, and excellent color retention, have been developed in the field of thermosetting compounds, many of which polymerize at room temperature. Because of the temperature factor, these compounds posed a problem in dispensing and which was unsatisfactorily overcome by the use of the compounds in small batches which could be dispensed quickly before polymerization began. The resins and a suitable catalyst are stored in separate containers, thus, the catalyst is mixed with the resin in the proper proportion, a chemical reaction takes place and the substance hardens within a short time. The present invention satisfactorily and effectively solves the aforementioned problem and thus overcomes the necessity for small batches by providing a pair of tubes for supplying the coating liquids to a rotor and a third or solvent tube for supplying a suitable solvent to clean the rotor, one tube of the pair injecting the resin into the rotor and the other tube of the pair injecting the catalyst with each being metered in the proper proportion. This coating process could be carried on indefinitely since there is no danger of clogging the supply system. If it is desired to suspend operation, the pair of tubes are shut off and a suitable solvent is injected into the rotor through the third tube while the rotor is still rotating.

The same general principle applies when, for example, it is desired to silver-coat an electrically non-conductive object for subsequent electroplating. Silver nitrate solution is fed in one tube, the reagent in the other, and plain water in the third. When it is desired to spray two non-blending colors to obtain a mottled texture, either twin rotors are used, one for each color, or one rotor is used with two ejector tubes, and in each case, one additional tube for the solvent to clean the rotor and to fill the sump thereof to prevent drying or caking of the coating liquid while suspending operations.

In view of the foregoing, it is one of the objects of this invention to provide a sprayer which overcomes the heretofore disclosed defects, disadvantages and unsatisfactory result of many prior art sprayers and in a manner whereby a satisfactory coating may be produced over a given area in substantially less time than has been possible in the past.

Another object of this invention is to provide a sprayer of the foregoing described character which is equipped with means whereby the sprayer may be readily flushed and cleaned, without the necessity of draining and flushing the liquid supply means.

A further object is to provide a sprayer of the foregoing described character which is equipped with means whereby several types, or colors, of liquid may be dispersed and sprayed simultaneously from their respective sources, each individually controlled.

An important object of the invention is to provide a sprayer of the foregoing described type wherein one or more various components thereof may be readily disassembled or assembled relative to others to effect spraying of preselected liquids with respect to color, volume, type and number.

Another important object of the invention is to provide a sprayer of the foregoing described character which is simple in construction, durable in use, efficient in operation and economical in manufacture.

A special object of my invention is to provide a method whereby an object to be coated is simultaneously sprayed by a plurality of coating liquids which are selectively metered, during spraying, if desired, to vary the effect of the coating on the object.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference character designate like parts throughout the several views:

FIGURE 1 is a side elevation of the spraying device adapted for vertical mounting on a floor or the like;

FIGURE 2 is a fragmentary vertical sectional view, partly in elevation, of the device;

FIGURE 3 is a sectional view showing the shaft and bearing arrangement;

FIGURE 4 is a cross-section on the line 4—4 of FIGURE 2;

FIGURE 5 is a detail view of the bell section;

FIGURE 6 is a sectional view of the spraying device for vertical mounting from a ceiling or the like;

FIGURE 7 is a cross-section on the line 7—7 of FIGURE 6; and

FIGURE 8 is a detail cross-section of the rotor.

An electrostatic sprayer S, to overcome the defects hereinbefore mentioned, must have two or more spray rotors and separate means for delivering coating liquids to each rotor.

Accordingly, the invention, as disclosed in FIGURES 1 to 5 of the drawings, comprises an inverted cup or cupuliform member 1 attached to a rotor shaft 2 by a nut 3 on the thread reduced end portion 4 of the shaft, thereby clamping the cup 1 against the flanged portion 5 of the shaft 2. An inner rotor 6 has an inner flange 7 seated against a bottom flange 8 of the cup 1.

An outer frustum-shaped partition 9 is disposed within the cup 1 and is provided with a flange 10 interposed between the flange 7 of the rotor 6 and spacers 11. These spacers 11 (four being indicated) are seated upon the flange 12 of an outer rotor 13 and thus serve to separate the rotors. An inner frustum-shaped partition 14 is disposed within the partition 9 and is provided with a flange 15 interposed between the flange 12 of the rotor 13 and a reinforcing or tie ring 16. This arrangement forms an annular chamber or sump 17 between the partition 9 and the inner rotor 6, and a similar chamber or sump 18 between the partition 14 and the outer rotor 13.

The sumps 17 and 18 are independent relative to each other and fluid cannot flow from one sump to the other. Screws 19 are threaded into openings 20 of the flange 8 of the cup 1 so that the rotors 6 and 13, and the partitions 9 and 14 and the cup 1 will rotate as a unit with the rotor shaft 2, the rotors 6 and 13 being maintained in a somewhat nested and spaced relation.

As illustrated in FIGURE 5, the cup 1 is provided with annularly spaced openings 21 coincident with the top surface of the flange 8 so that any fluid which may be ejected against the inclined side and top walls of the cup 1 or the top surface of the flange 8 can flow through the openings 21 to the inner surface of the rotor 6, said opening such as 21, providing surfaces for accelerating the flow of fluid material to the same rotational speed as the outer margin edge 96 of the rotor.

As depicted in FIGURES 1 to 3, a stationary bearing housing 22, in which the shaft 2 rotates freely, has attached thereto supporting structure means including a ring 23 in which is threaded communicating pairs of liquid fittings 24 and 25 interposed within fluid supply tubes 26 and 27, respectively. At their upper ends, the tubes 26 and 27 are curved to extend into the annular chambers 17 and 18, between the partition 9 and rotor 6, and between the partition 14 and rotor 13, respectively.

The opposite ends of the tubes 26 and 27 are each connected to an independent source of liquid supply and may be equipped with means for metering or controlling the flow of liquid therethrough whereby to effect spraying of liquids of different colors, volumes, types and numbers, either singly or in various combinations to conform to a preestablished pattern. By unscrewing the coupling nuts of the fittings 24 and 25, the supply tubes 26 and 27 may be removed when dismantling the rotors.

As shown in FIGURE 3, the extension of shaft 2 is of a reduced diameter within the housing 22 to receive inner races of spaced ball bearings 29 separated by a spacer 30. The bearings 29 are press-fitted into the stationary housing 22 and secured against axial movement by a split ring 31 and a collar 32 having a skirt threaded on the housing 22. A threaded coupling 33 is screwed on the threaded reduced extension of the shaft 2 and held fixed thereto by a set screw 34. Teeth 35 on the end of the coupling 33 are in mesh with mating teeth 36 of a matching coupling 37. An extension shaft or torque tube 38, made of an electrically non-conductive material, is press-fitted into the coupling 37 and held fixed thereto by a screw 38a. The tube 38 is similarly coupled at its other end to the shaft of a suitable drive motor (not shown).

A supporting casing 39, disposed about the tube 38, is attached to the bearing housing 22 and held by a clamp 40 provided on the housing and equipped with a screw 41. The casing 39, as well as the tube 38, is made of an electrically non-conductive material to insulate the housing 22, ring 23, tubes 26 and 27, shaft 2, cup 1, partitions 9 and 14, and rotor assembly from ground when a high electrical potential from a high voltage source 42 is applied through a conductor 43 and a terminal screw 44 attached to the ring 23, the source 42 and the grounded object 45 to be coated being diagrammatically illustrated in FIGURE 1.

FIGURES 6 and 7 show the sprayer adapted for vertical overhead mounting. A suspended shaft 51, similar to that of shaft 2 in FIGURE 1, has a flanged portion 52 on the lower end thereof, against which a circular plate 53 is clamped by the nut 54. Three rotors 55, 56 and 57 are nested one inside another in spaced relation. The two innermost rotors 55 and 56 have inturned flanges 58 and 59, constituting their bottom walls, seated against the outwardly disposed flanges 60 and 61 of outer and inner frustum-shaped spaced partitions 62 and 63 extending about the shaft 51. The rotor 55 and partition 61 define a sump or chamber 64 and are separated from the rotor 56 and partition 63 by spacers 65 to provide a chamber 66. The rotor 57, which is provided with an inwardly directed flange 67 constituting its bottom wall, is separated from the adjacent intermediate rotor 56 and the flange 61 of the partition 63 by spacers 68 to provide a sump or chamber 69.

The rotors 55, 56 and 57 together with the partitions 62 and 63 and the spacers 65 and 68 constitute a rotor assembly wherein the components are secured together in fixed relation by bolts 70 extending through the plate 53, flange 67, spacers 68, flanges 61 and 59, spacers 65, flanges 60 and 58 and which bolts 70 are threaded into a clamping ring 71 disposed on the flange 58 within the sump 64 whereby the assembly is rotated in unison with the shaft 51, the flange portion 52 of the shaft coacting with the plate 53 to clamp the bottom 67 of the rotor therebetween against leakage.

Supply tubes 72, 73 and 74, for supplying the coating fluids, extend through sleeves 75, supported by a ring 76 mounted on the bearing housing 77, the latter being identical with the housing 22 including the connections with the drive motor and casing 78. The tubes 72, 73 and 74 extend into the annular chambers or sumps 64, 66 and 69, respectively, for supplying the sumps with desirable fluids for spraying by the rotors. As in the instances of the tubes 26 and 27, shown in FIGURES 1 to 4, the tubes 72, 73 and 74 are similarly connected to independent sources of liquid supplies and equipped with the metering or controlling means for effecting a like spraying method. As in connection with FIGURES 1 to 5, the casing 78, as well as the enclosed extension shaft or torque tube therein, is made of an electrically non-conductive material to insulate the components of the rotor assembly and the housing 77 from ground when a high electrical potential is applied to the assembly, for instance, by a conductor 79 connected to the ring 76 by a binding screw 80. For simplicity of illustration only, one tube for each chamber is shown; however, in a practical application of this invention two or more tubes may be used.

Each of the rotors herein employed, as typified in FIGURE 8, is of a somewhat campaniform parabolic contour and fashioned with an inverted frustum-shaped central portion 90 of a greater diameter at its upper end than at its lower end to provide an inclined side wall 91 having an inner face 92 over which liquid impinges and flows. The side wall terminates, at its lower end, in a bottom wall formed with a centrally disposed opening 93 through which the drive shaft for the rotor extends. The upper end of the wall 91 merges, by curvature, into an outer dished discal portion 94 constituting an upwardly and outwardly inclined outer wall or flange 95 terminating at its outer margin in a sharp edge 96 to provide a corona discharge during electrostatic spraying, the fluid from the portion 90 being centrifuged over the flat upper face 97 of the wall 94 in a relatively thin film and discharged over the edge 96 by rotation of the rotor. I have discovered that best results are obtained with rotors in which angle A is 5°, angle B is 18°, dimensions C and D are in the ratio of 1 to 1, and the ratio of the diameter of E to the diameter of C is 6½ to 1, the radius of R being such as to effect free and even flow of the liquid from within the portion 90. However, other dimensions and angles may give satisfactory results.

In operation, the object 45 to be coated is mounted, together with others, on a conveyor and moved past the sprayer S, it being understood that the conveyor and the objects to be coated are grounded and the sprayer S connected to the negative terminal of a high potential electric source. The positive terminal of the source is also grounded, thereby creating an electrostatic field between the sprayer S and the article or object 45 to be coated. The sprayer, as a unit, may be secured to a suitable reciprocating apparatus, such as a hydraulic piston with suitable controls for optimum stroke and rate of motion.

The rotors of the sprayer are rotated by a suitable explosion proof motor mounted on the hydraulic piston and adapted to rotate the rotor shaft as heretofore disclosed. The insulating casing is attached to the motor by clamping means similar to that on the bearing housing. The distance between the motor and the rotor assembly must be sufficient to prevent arcing. All conduits supplying fluid to the sprayer must be electrically non-conductive to insulate the sprayer from ground.

Referring to the floor mounted vertical sprayer S shown in FIGURES 1 to 5, coating liquid is supplied through the tubes 26 and 27 to the annular chambers or sumps 17 and 18, whereupon centrifugal force causes the liquid to flow up the side walls 91 of the rotors 6 and 13 and on to the walls 95 in a thin film. As the liquid is discharged over the edges 96 it becomes electrically charged and at a polarity opposite to that of the objects to be coated, it being understood that the rotors are connected to the high electrical potential and that a corona discharge is created at the sharp edges 96, whereby an electrostatic field is established between the rotors and the objects to be coated. As the liquid is expelled from the edges of the rotors, it is atomized into a fine mist or fog due to the molecular repulsion of the highly charged particles thereof. The particles are attracted by, and surround, the objects to be coated since they are of a different polarity. In the use of two or more stacked or nested rotors, the expelled liquid from the rotors is of the same polarity and the particles are repelled in a wide pattern with a resultant larger area coverage.

Due to air resistance the finely dispersed particles lose their inertia and move solely under the influence of the electrostatic field. As a result, all of the expelled coating liquid is attracted to the objects or articles to be coated, so that particles originally flowing toward the spaces between the articles are attracted to the sides of the articles. Very little, if any, of the coating liquid is wasted.

Referring to FIGURE 2, if it is desired to spray thermosetting compounds, the sprayer will be provided with three supply tubes 26 extending into the annular chamber 17, and three supply tubes 27 extending into the annular chamber 18. The rotors 6 and 13 are rotated by the electric motor and a high electric potential is applied to the rotors by the conductor 43. The resin is supplied to each chamber through one of the supply tubes while another supply tube conveys the catalyst to each chamber. The flow of resin and catalyst is adjusted to achieve the proper mixing ratio. As the rotors turn at high speed, the resin and catalyst are mixed in the chambers during the spraying process. Since the resin and catalyst are not mixed until after leaving the tubes 26 and 27, there is no danger of clogging. When the spraying operation is completed, the flow of resin and catalyst is stopped and a suitable solvent is injected into each chamber by the third tubes 26 and 27. As the rotors turn, the solvent will be discharged over the surfaces of the rotors, dissolving any remaining compound.

According to this invention a large volume of coating liquid can be sprayed from a single sprayer of reasonable dimensions; and the cost of maintenance is substantially reduced. This invention not only provides a method for obtaining various coating finishes heretofore unattainable by controlling the delivery of the liquids to the rotors but also allows the use of compounds and techniques never possible before with a sprayer of this type. Thermosetting compounds may be used without costly stoppages to free the clogged sprayer. Mottled finishes and mixed colors are also possible with this sprayer.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined solely to the use herein disclosed in connection therewith as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claims.

We claim:

1. For use in a wide-spray band electrostatic coating system for coating an article with electrostatically charged particles of fluid material and wherein said article and said particles of fluid coating material are oppositely charged from a high potential source for electrostatic deposition of said particles on said article, a sprayer comprising a plurality of rotors, each including a base flange and a surrounding substantially frustum-shaped side wall, said rotors being nested one within another with the base flanges thereof spaced apart, upstanding partitions connected with said base flanges of the respective rotors and cooperating therewith to form an annular central chamber within each rotor, spacer means between said base flanges, fastenings connected with said base flanges for securing said rotors together in a unitary assembly, an inverted cup-shaped member extending over said chambers and having a surrounding wall connected with said fastenings in rigid relation with said rotors, said surrounding wall having openings arranged therein for discharge of coating fluid therethrough from one of said chambers to the circumjacent wall of one of said rotors, said fastenings and spacer means being circumferentially spaced for discharge of fluid from another of said chambers between said rotors to the circumjacent wall of another of said rotors, a drive shaft connected with said member for rotating said rotors, a plurality of tubes extending into said chambers for supplying coating fluids thereto for discharge out of said chambers and off of said rotors by centrifugal force upon rotation of said rotors, and means for connecting a source of high potential to said rotors.

2. Sprayer apparatus for mixing a plurality of different fluid spray materials in a mixing area on the surface of a rotating element and spraying an object with the fluid spray material after being mixed on said surface of said rotating element and after comminution of the spray material in a system with said fluid spraying material particles being electrically charged to facilitate deposition of said fluid spray material particles onto said object, said sprayer apparatus including a rotating element having a surface for receiving said plurality of different fluid spraying materials and a peripheral discharge edge for emitting therefrom in comminuted form an annular spray pattern of said fluid spray material mixed on said rotating surface, tube supporting structure means disposed adjacent said rotating element, a plurality of fluid supply tubes carried by said supporting structure means, said supporting structure means including positioning means for selectively positioning at least two of said supply tubes each with a free end opening thereof for emitting fluid coating material to be deposited upon a surface of said rotating element, and coupling means for coupling an independent source of fluid spray material to each of said plurality of fluid supply tubes for interchangeably selecting the desired fluid spray material comminuted and sprayed from said rotating element.

3. Sprayer apparatus having a rotating element as set forth in claim 2, and wherein said rotating element has a multiplicity of accelerator surfaces disposed intermediate the mixing area on the surface of the rotating element and the peripheral discharge edge for impinging said fluid spray materials in transit from said mixing area to said peripheral discharge edge for moving said material at said moment of impingement at a rotational speed substantially similar to that of the rotational speed of the peripheral discharge edge.

4. A sprayer for mechanically comminuting and electrostatically depositing upon an object fluid spray material in a system with the comminuted fluid spray material being electrostatically charged to facilitate deposition of the comminuted fluid spray material upon the object to be coated, said sprayer including a plurality of rotors each having a peripheral discharge edge for emitting therefrom atomized fluid spray material, said peripheral discharge edge of said rotors being spaced apart for centrifugal discharge of comminuted fluid spray material over said respective peripheral discharge edges, supporting structure means disposed adjacent said plurality of rotors, a plurality of supply tube means carried by said supporting structure and disposed for supplying at least two different fluid spray materials to each of said plurality of rotors, a plurality of independent fluid spray material sources, and coupling means for selectively coupling two or more of said fluid spray material sources with certain of said supply tube means carried by said supporting structure means for selectively feeding fluid spray material from said independent sources to preselected rotors for mixing said materials on said rotors.

5. A sprayer for mechanically comminuting and electrostatically depositing upon an object fluid spray material in a system with the comminuted fluid spray material being electrostatically charged to facilitate deposition of the comminuted fluid spray material upon the object to be coated in accordance with claim 4, wherein certain of said plurality of rotors have a multiplicity of accelerator surfaces disposed intermediate the mixing area and the peripheral discharge edge for impinging said fluid spray materials in transit from said mixing area to said respective peripheral discharge edge for moving said material at said moment of impingement at a rotational speed substantially similar to that of the rotational speed of the peripheral discharge edge.

References Cited in the file of this patent
UNITED STATES PATENTS

| | | |
|---|---|---|
| 1,022,956 | Lengerke et al. | Apr. 9, 1912 |
| 1,490,632 | Paul | Apr. 15, 1924 |
| 1,492,750 | Rogers et al. | May 6, 1924 |
| 1,832,096 | Chaffee | Nov. 17, 1931 |
| 2,257,807 | Morse | Oct. 7, 1941 |
| 2,369,216 | Crisp | Feb. 13, 1945 |
| 2,759,763 | Juvinall | Aug. 21, 1956 |
| 2,764,712 | Juvinall | Sept. 25, 1956 |
| 2,781,279 | Miller | Feb. 12, 1957 |
| 2,809,902 | Ransburg | Oct. 15, 1957 |
| 2,922,584 | Slatkin | Jan. 26, 1960 |